No. 770,605. PATENTED SEPT. 20, 1904.
P. PAGE.
CURTAIN FIXTURE.
APPLICATION FILED AUG. 1, 1904.
NO MODEL.

WITNESSES.
C. T. Hannigan
Florence E. Oates

INVENTOR.
Peter Page
By James L. Jenks
Atty.

No. 770,605.	Patented September 20, 1904.

UNITED STATES PATENT OFFICE.

PETER PAGE, OF ATTLEBORO, MASSACHUSETTS.

CURTAIN-FIXTURE.

SPECIFICATION forming part of Letters Patent No. 770,605, dated September 20, 1904.

Application filed August 1, 1904. Serial No. 218,966. (No model.)

*To all whom it may concern:*

Be it known that I, PETER PAGE, a citizen of the United States, residing at Attleboro, in the county of Bristol and State of Massachusetts, have invented certain new and useful Improvements in Curtain-Fixtures, of which the following is a specification.

My invention relates to improvements in curtain-fixtures; and its purpose is to provide a fixture which is easily and quickly adjustable, so as to accommodate curtain-rollers of varying lengths. I accomplish this purpose by the device shown in the accompanying drawings, in which—

Figure 1:
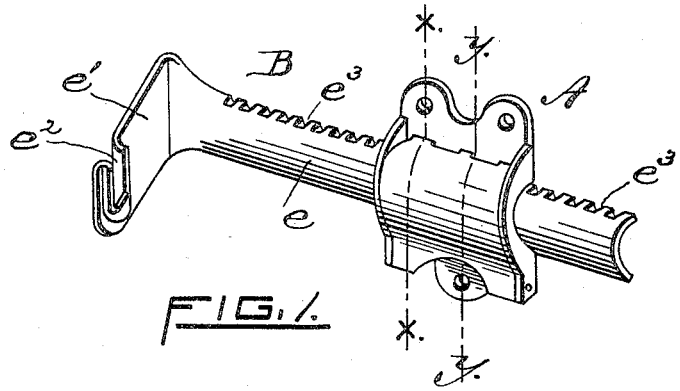
Figure 2:
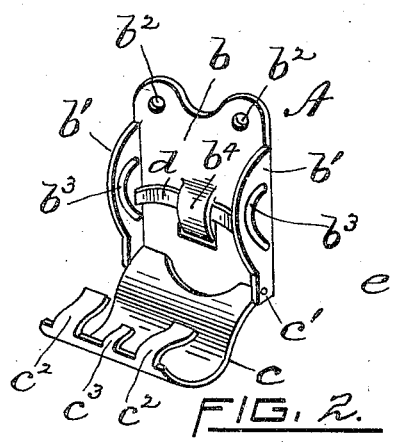
Figure 3:
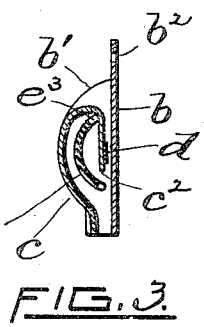
Figure 4:
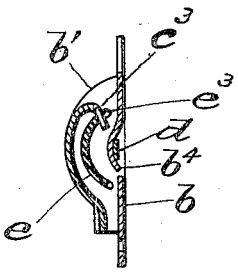
Figure 5:
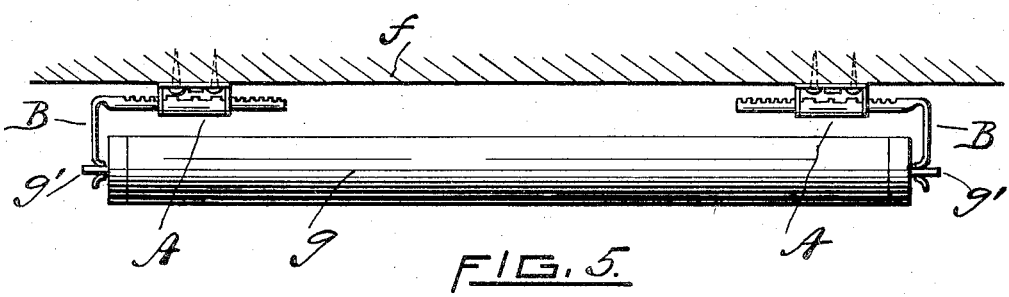

Figure 1 is a perspective of the entire fixture; Fig. 2, a perspective of one member of my invention; Fig. 3, a sectional view through the line $x\ x$ of Fig. 1; Fig. 4, a vertical section through the line $y\ y$ of Fig. 1; Fig. 5, a plan view of the roller and fixture in position.

In Fig. 1, A is a bracket, and B a rack-bar having a hollow shank $e$ of approximately semicylindrical cross-section, its upper edge being toothed, as shown at $e^3$. The member B is bent at right angles, forming the lug $e'$, having in it the slot $e^2$ for the reception of the end of the roller $g$.

The bracket A is shown in detail in Fig. 2. It is composed of a single piece of metal $b$, having struck up on it the two side pieces or lugs $b'\ b'$ and the projection $b^4$, by which is secured to the inside of the back $b$ a flat spring $d$. The lugs $b'\ b'$ are perforated with the holes $b^3\ b^3$, in which the shank $e$ of the rack-bar B slides easily. $b$ is perforated with the holes $b^2\ b^2$ at the top and a like hole at the bottom of the back for the pins or screws to fasten the bracket A to the window-frame. Attached to $b$ is the flap $c$, which is hinged at $c'$, as shown. $c$ is provided with projections $c^2\ c^2$ and the tooth $c^3$. The tooth $c^3$ is adapted to fit the depressions in the rack $e^3\ e^3$ of the member B and lock it in position. The projections $c^2\ c^2$ bear against the extremities of the spring $d$ when the member $c$ is fixed in position, and by the operation of said spring and tooth $c^3$ the rack-bar and bracket are locked securely in any desired relative position. The shape of the flap $c$ is adapted to permit the insertion of the member B through the orifices $b^3\ b^3$ of the member A, as shown in vertical section in Fig. 3.

The operation of my device is as follows: The member $c$ is closed upon $b$ until the projections $c^2\ c^2$ come in contact with the spring $d$. By a slight pressure of the thumb on the back of the flap $c$ space is made for the introduction of the member B, which is pushed one way or other until the desired position is secured, when the pressure from the back of $c$ is released and the tooth $c^3$ on the flap $c$ engages the rack $e^3$ of the member B and holds it firmly in position with reference to A until it is released by a pressure upon the back of the flap $c$, the engagement of $c^3$ with the rack $e^3$ being effected by the reaction of the spring $d$ on the projections $c^2\ c^2$ of the flap $c$.

My device is made preferably of sheet metal, each of the members $b$, $c$, and B being struck from single pieces of metal. Instead of having a hollow semicylindrical cross-section the shank of B may have a hollow rectangular or triangular cross-section equally well.

Having now described my invention, what I claim, and desire to secure by Letters Patent, is—

1. In a curtain-fixture, a bracket having side lugs perforated for the passage of a rack-bar; a spring fixed upon the inner face of said bracket; a flap hinged by one edge upon said bracket and having upon its free edge the projections $c^2\ c^2$ and a tooth $c^3$ and operating by means of said spring, projections and tooth to adjustably secure a rack-bar within said bracket substantially as described.

2. A curtain-fixture consisting of a rack-bar slotted to receive a curtain-roller; a bracket having a spring fixed on its inner face and side lugs perforated for the passage of said rack-bar; a flap hinged upon said bracket and provided at its free edge with projections $c^2$ $c^2$ adapted to engage said spring, and a tooth $c^3$ adapted to engage the depressions in said rack-bar and operating to retain the same in a fixed position with reference to said bracket
5 by the operation of said spring, and to release the same for adjustment by the depression of said spring, substantially as set forth.

In testimony whereof I affix my signature in presence of two witnesses.

PETER PAGE.

Witnesses:
  JAMES L. JENKS,
  FLORENCE E. BATES.